under 35 U.S.C. 154(b) by 45 days.

(12) United States Patent
Luo et al.

(10) Patent No.: US 8,989,121 B2
(45) Date of Patent: Mar. 24, 2015

(54) BLINDLY DECODING INTERFERING CELL PDCCH TO ACQUIRE INTERFERING CELL PDSCH TRANSMISSION INFORMATION

(71) Applicant: QUALCOMM Incorporated, San Diego, CA (US)

(72) Inventors: Tao Luo, San Diego, CA (US); Yongbin Wei, San Diego, CA (US); Peter Gaal, San Diego, CA (US); Durga Prasad Malladi, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 13/663,912

(22) Filed: Oct. 30, 2012

(65) Prior Publication Data

US 2013/0121168 A1    May 16, 2013

Related U.S. Application Data

(60) Provisional application No. 61/554,874, filed on Nov. 2, 2011, provisional application No. 61/662,004, filed on Jun. 20, 2012.

(51) Int. Cl.
*H04W 4/00* (2009.01)
*H04W 72/04* (2009.01)
(Continued)

(52) U.S. Cl.
CPC ............ *H04W 72/042* (2013.01); *H04L 5/0048* (2013.01); *H04L 5/0053* (2013.01); *H04W 72/082* (2013.01); *H04L 5/0073* (2013.01); *H04L 1/0046* (2013.01)
USPC .......................................................... 370/329

(58) Field of Classification Search
None
See application file for complete search history.

(56) References Cited

U.S. PATENT DOCUMENTS

2010/0271988 A1    10/2010   Jia et al.
2011/0116428 A1    5/2011    Seong et al.
(Continued)

FOREIGN PATENT DOCUMENTS

| WO | 2010003034 A1 | 1/2010 |
| WO | 2011014738 A2 | 2/2011 |
| WO | 2011052869 A1 | 5/2011 |

OTHER PUBLICATIONS

International Search Report and Written Opinion—PCT/US2012/062682—ISA/EPO—Jan. 18, 2013.
(Continued)

*Primary Examiner* — Anh-Vu Ly
(74) *Attorney, Agent, or Firm* — Patterson & Sheridan, L.L.P.

(57) ABSTRACT

Certain aspects of the present disclosure relate to a technique for blindly decoding interfering cell Physical Downlink Control Channel (PDCCH) to acquire interfering cell Physical Downlink Shared Channel (PDSCH) transmission information. A UE may determine, for one or more aggregation levels, sets of CCEs that potentially include the PDCCH, based on available CCEs for each aggregation level and identify a set of decoding candidates based on the determination. Once the decoding candidates are decoded, the UE may perform an error correcting procedure on decoded candidates and prune out unlikely candidates. Likely decoded candidates may be further pruned based on comparison of CRC calculated using information bits only and possible Radio Network Temporary Identifiers (RNTIs). The UE may then interpret content of the PDCCH of the interfering cell based on surviving candidates. The UE may then use the interpreted PDCCH information to determine PDSCH information.

27 Claims, 9 Drawing Sheets

(51) Int. Cl.
*H04L 5/00* (2006.01)
*H04W 72/08* (2009.01)
*H04L 1/00* (2006.01)

(56) References Cited

U.S. PATENT DOCUMENTS

| | | |
|---|---|---|
| 2011/0274031 A1 | 11/2011 | Gaal et al. |
| 2012/0122472 A1 | 5/2012 | Krishnamurthy et al. |
| 2012/0201152 A1* | 8/2012 | Yoo et al. ............... 370/252 |
| 2012/0201162 A1 | 8/2012 | Kim et al. |
| 2012/0327795 A1* | 12/2012 | Mallik et al. ............ 370/252 |
| 2013/0016655 A1* | 1/2013 | Heo et al. ............... 370/328 |
| 2013/0058240 A1* | 3/2013 | Kim et al. .............. 370/252 |
| 2013/0114429 A1 | 5/2013 | Jonsson et al. |
| 2013/0114449 A1* | 5/2013 | Luo et al. ............... 370/252 |
| 2013/0301587 A1 | 11/2013 | Luo et al. |
| 2013/0336263 A1* | 12/2013 | Wang ...................... 370/329 |

OTHER PUBLICATIONS

3rd Generation Partnership Project; Technical Specification Group Radio Access Network; Evolved Universal Terrestrial Radio Access (E-UTRA); Physical layer procedures (Release 9), 3GPP Draft; 3GPP TS 36.213, V9.2.0, 3rd Generation Partnership Project (3GPP), Mobile Competence Centre ; 650, Route Des Lucioles; F-06921 Sophia-Antipolis Cedex ; France, val. RAN WG1, no. Madrid, Spain; Aug. 27, 2010, [retrieved on Aug. 27, 2010].

* cited by examiner

BLINDLY DECODING INTERFERING CELL PDCCH TO ACQUIRE INTERFERING CELL PDSCH TRANSMISSION INFORMATION

The present application for Patent claims priority to U.S. Provisional Application No. 61/554,874, entitled "BLINDLY DECODING INTERFERING CELL PDCCH TO ACQUIRE INTERFERING CELL PDSCH TRANSMISSION INFORMATION," filed Nov. 2, 2011, and U.S. Provisional Application No. 61/662,004, also entitled "BLINDLY DECODING INTERFERING CELL PDCCH TO ACQUIRE INTERFERING CELL PDSCH TRANSMISSION INFORMATION," filed Jun. 20, 2012, and assigned to the assignee hereof and hereby expressly incorporated by reference herein.

BACKGROUND

1. Field

The present disclosure relates generally to communication systems, and more particularly, to a technique for blindly decoding interfering cell Physical Downlink Control Channel (PDCCH) to acquire interfering cell Physical Downlink Shared Channel (PDSCH) transmission information.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communication. The method generally includes determining, for one or more aggregation levels, sets of control channel elements (CCEs) that potentially include a control channel, based on one or more constraints on available CCEs for each aggregation level, identifying a set of one or more decoding candidates for the control channel transmitted in an interfering cell based on the determination, evaluating the set of candidates to decode the control channel from one or more surviving candidates, interpreting information from the decoded control channel, and using the interpreted information to decode transmissions in the interfering cell for use in performing interference cancellation to aid in decoding transmissions in a serving cell.

Certain aspects of the present disclosure provide an apparatus for wireless communication. The apparatus generally includes means for determining, for one or more aggregation levels, sets of control channel elements (CCEs) that potentially include a control channel, based on one or more constraints on available CCEs for each aggregation level, means for identifying a set of one or more decoding candidates for the control channel transmitted in an interfering cell based on the determination, means for evaluating the set of candidates to decode the control channel from one or more surviving candidates, means for interpreting information from the decoded control channel, and means for using the interpreted information to decode transmissions in the interfering cell for use in performing interference cancellation to aid in decoding transmissions in a serving cell.

Certain aspects of the present disclosure provide a computer program product for wireless communication, the computer program product generally including a computer-readable medium having code for determining, for one or more aggregation levels, sets of control channel elements (CCEs) that potentially include a control channel, based on one or more constraints on available CCEs for each aggregation level, identifying a set of one or more decoding candidates for the control channel transmitted in an interfering cell based on the determination, evaluating the set of candidates to decode the control channel from one or more surviving candidates, interpreting information from the decoded control channel, and using the interpreted information to decode transmissions in the interfering cell for use in performing interference cancellation to aid in decoding transmissions in a serving cell.

Certain aspect of the present disclosure provide an apparatus for wireless communications, the apparatus generally including a processing system configured to determine, for one or more aggregation levels, sets of control channel elements (CCEs) that potentially include a control channel, based on one or more constraints on available CCEs for each aggregation level, identify a set of one or more decoding candidates for the control channel transmitted in an interfering cell based on the determination, evaluate the set of candidates to decode the control channel from one or more surviving candidates, interpret information from the decoded control channel, and use the interpreted information to decode transmissions in the interfering cell for use in performing interference cancellation to aid in decoding transmissions in a serving cell.

DETAILED DESCRIPTION

Figure 1:
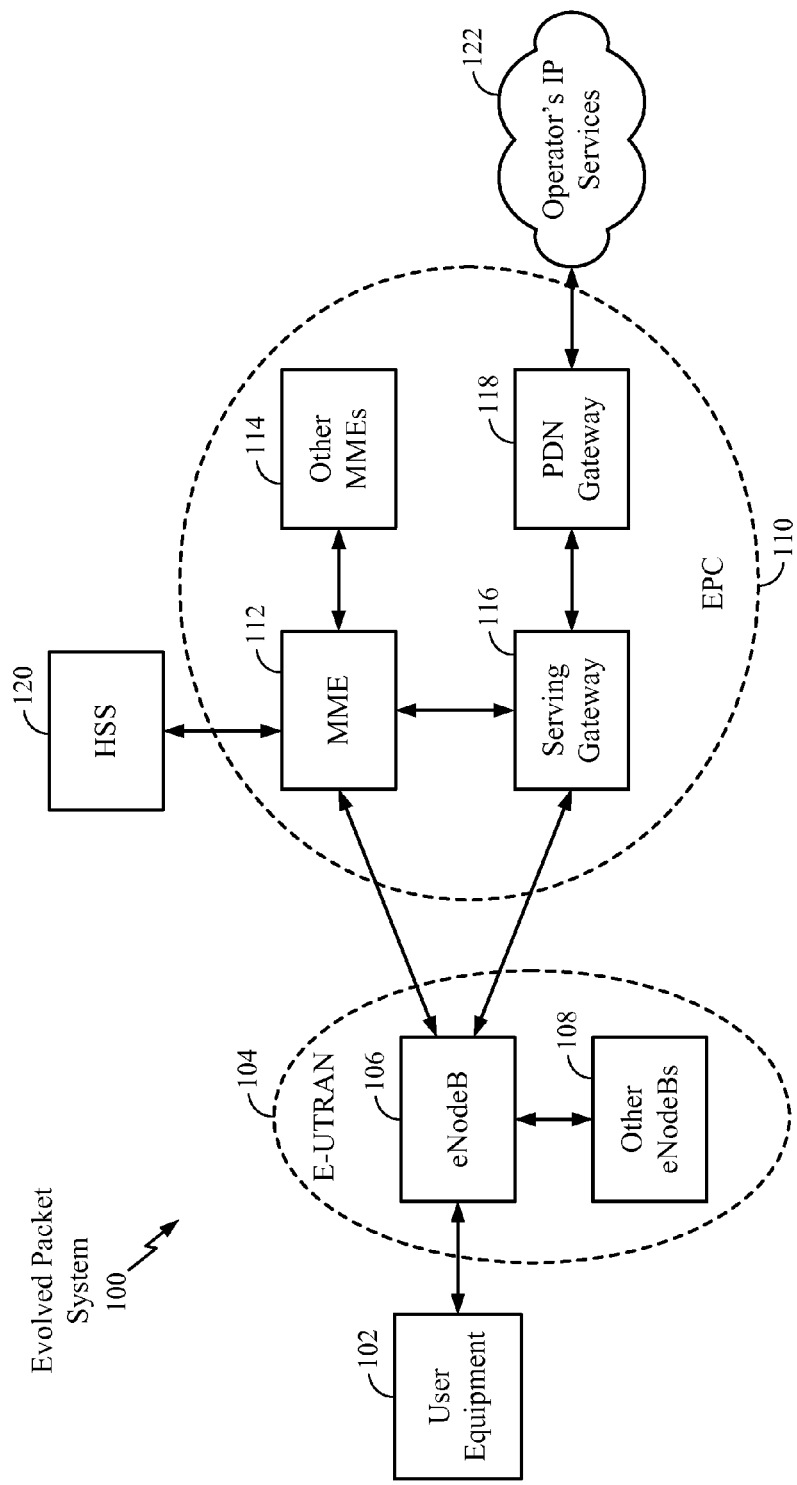
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
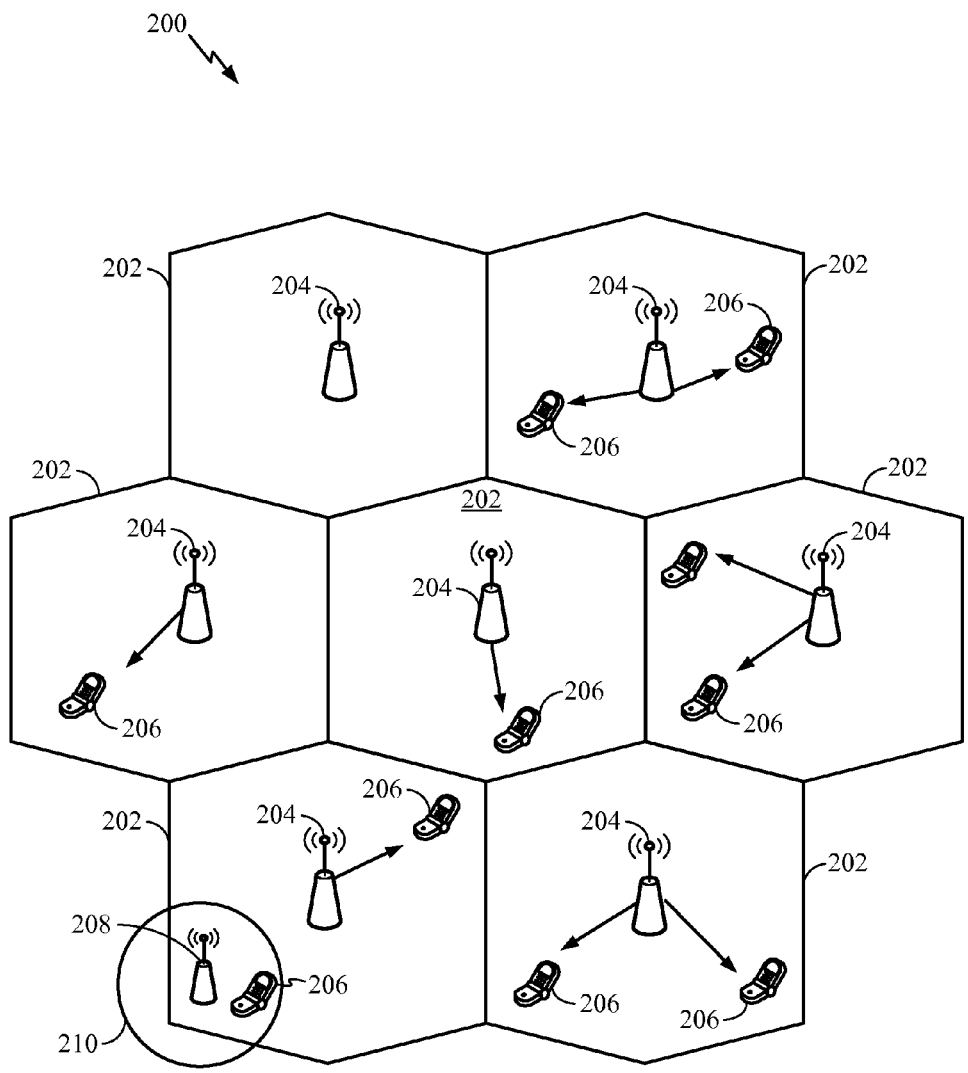
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB

208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
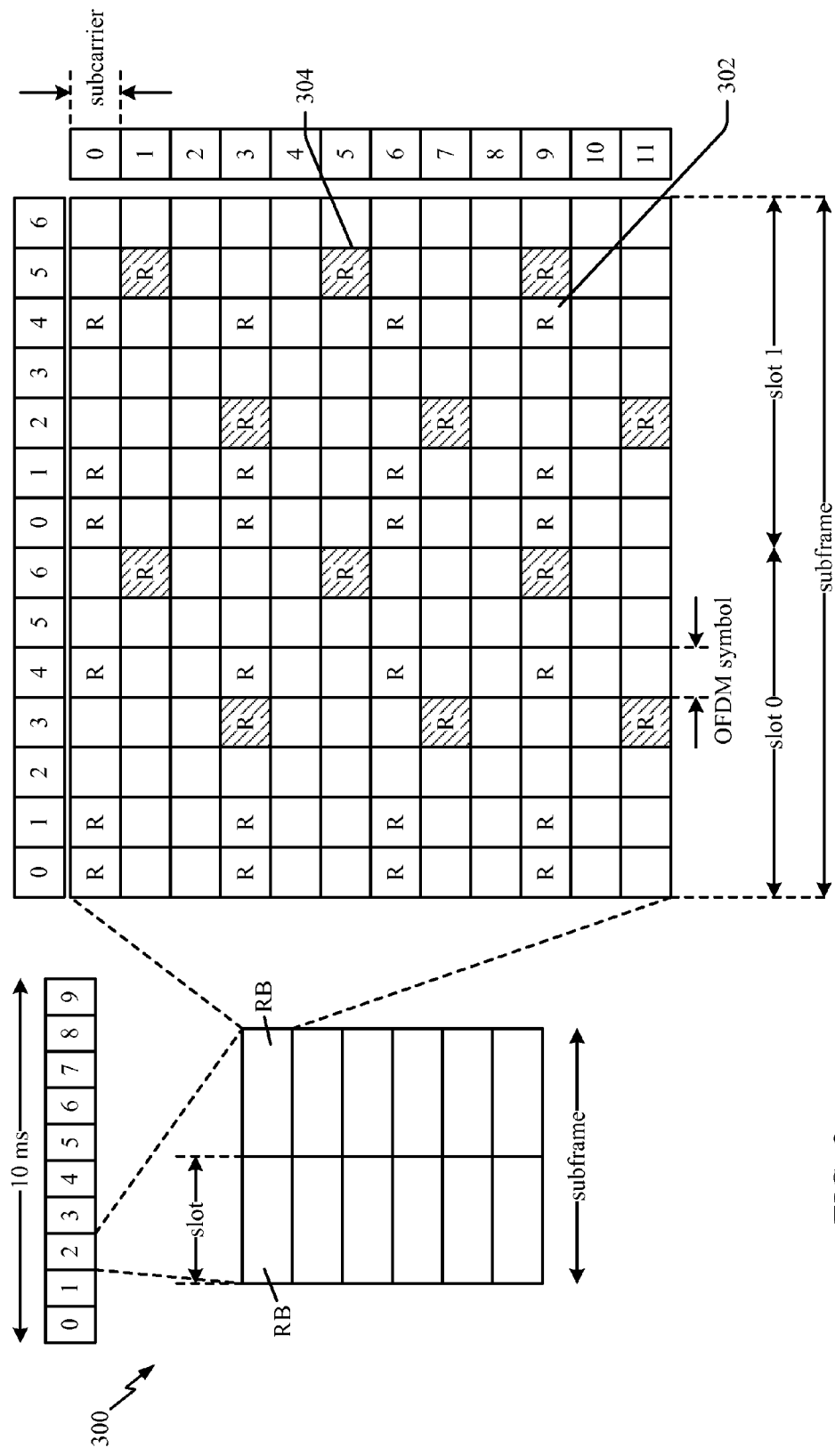
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
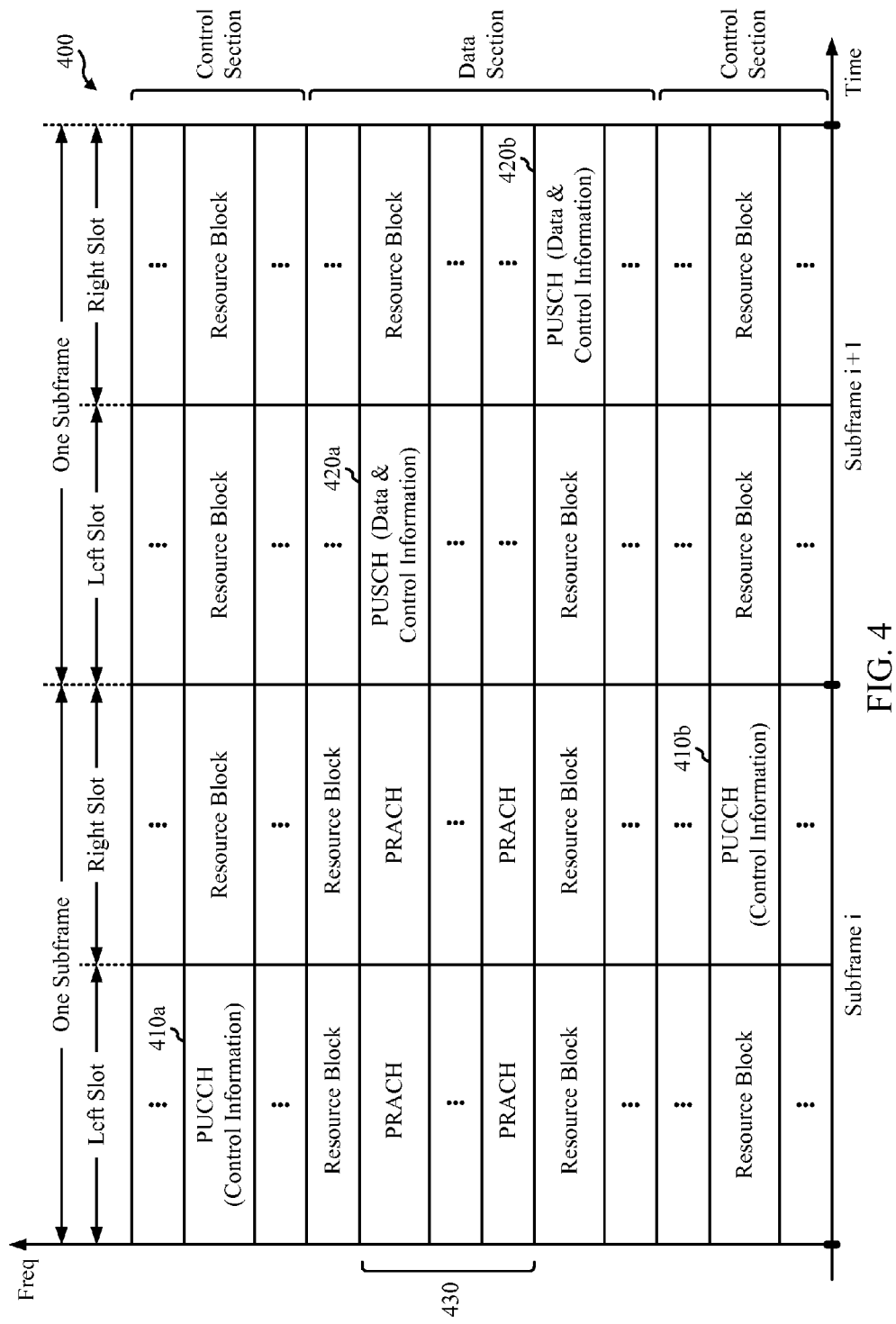
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
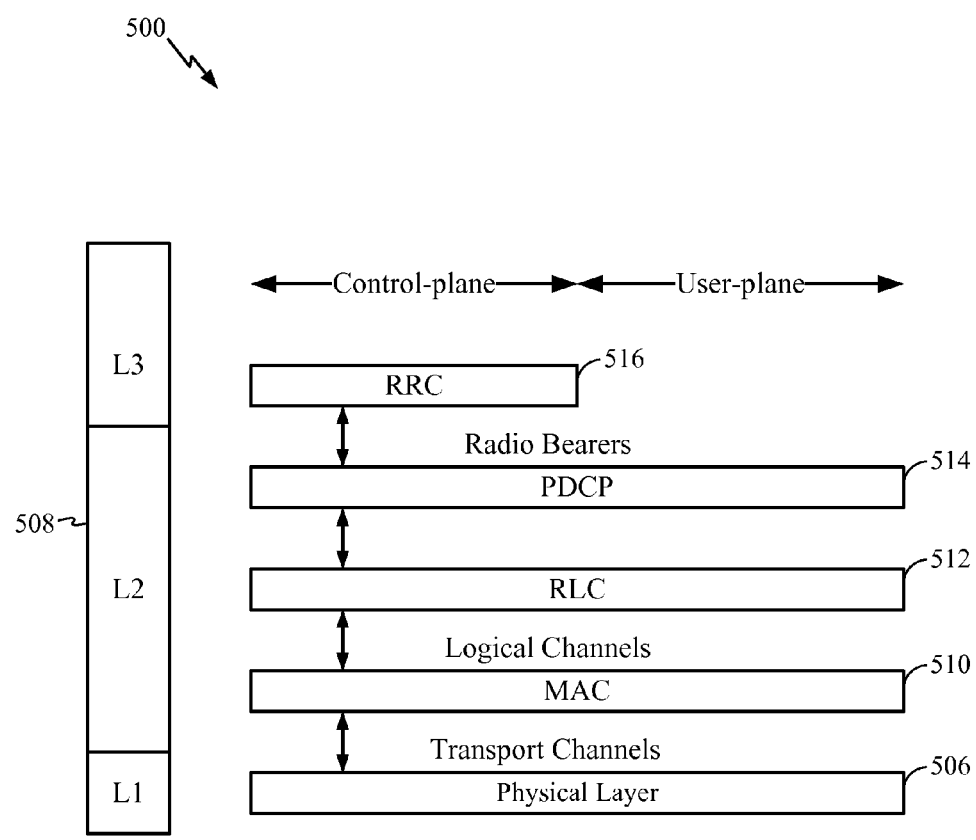
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
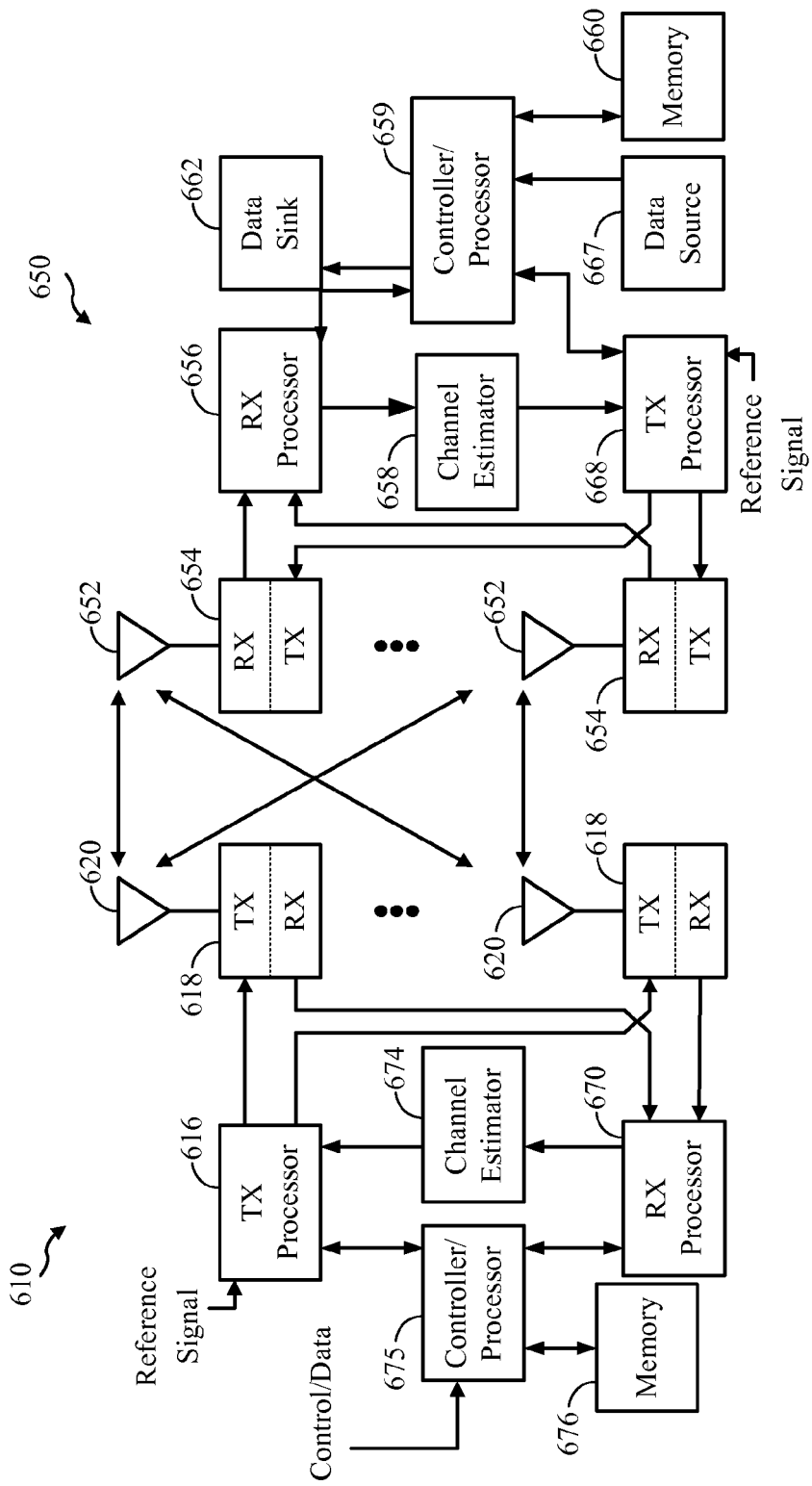
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for /the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Blindly Decoding Interfering Cell Pdcch to Acquire Interfering Cell PDSCH Transmission Information In certain aspects, significant IC gain may be achieved for control and data channel interference cancellation (IC) if UE knows certain information regarding Physical Downlink Shared Channel (PDSCH) of the interfering cell. The PDSCH information may include rank, modulation order and/or resource block (RB) allocation. In certain aspects, for other applications (e.g., SWIM), the UE may want to know the loading condition of a cell for better radio interface selection.

Typically, a UE may determine the PDSCH information for a serving cell by decoding the Physical Downlink Control Channel (PDCCH) of the serving cell. However, for an interfering cell, the PDCCH information may not be available and thus the UE may not know the PDSCH information. In certain aspects, the UE may blindly decode the PDCCH of the interfering cell in order to determine the PDSCH information.

In certain aspects, the UE may obtain information about the Physical Hybrid ARQ Indicator Channel (PHICH) of an interfering cell by decoding the Physical Broadcast Channel (PBCH). The PHICH information may include duration of the PHICH and resource allocation to the PHICH. From cell identifier (ID) information and the PHICH information the UE may determine Control Channel Element (CCE) structure of the cell.

The UE may then estimate (for each subframe) Traffic to Pilot Ratio (TPR) per Resource Element Group (REG) for all possible REGs for the cell. Based on the TPR estimation, the UE may determine if a particular CCE has potential transmission of the PDCCH from the cell. Thus, the UE has information regarding which CCEs have potential PDCCH transmission. In an aspect, a high TPR indicates that there may be a transmission, whereas a low TPR indicates that there may not be a transmission.

However, the UE still does not know an aggregation level (e.g. aggregation levels 1, 2, 4 or 8) for the PDCCH transmission, a location of the CCE within an aggregation level and a payload size of the PDCCH in the CCE. Thus, for each CCE with potential PDCCH transmission, the UE may have to decode for multiple combinations (or decoding candidates) based on the aggregation level, location of the CCE, and the payload size.

In certain aspects, the CCEs corresponding to a particular aggregation level generally begin at particular CCEs. For example, assuming a 16 CCE structure, the starting CCEs for aggregation level 8 may be CCEs 0 and 8. Similarly, starting CCEs for aggregation level 4 may be CCEs 0, 4, 8 and 15, starting CCEs for aggregation level 2 may be every even numbered CCE. Aggregation level 1 CCEs may be any of the 16 CCEs. Thus, in an aspect, a set of CCEs (or decoding candidates) may be determined for each aggregation level based on the available CCEs for that aggregation level, based on the starting CCEs for that aggregation level.

Thus, For example, for 8 CCEs, aggregation level 1 has eight decoding candidates; aggregation level 2 has four candidates; aggregation level 4 has two candidates; and aggregation level 8 has only one candidate. Accordingly, for every 8 CCE, there may be 8+4+2+1=15 decoding candidates per payload size.

Similarly, for 40 CCEs, aggregation level 1 has forty candidates; aggregation level 2 has twenty candidates; aggregation level 4 has ten candidates and aggregation 8 has five candidates. Thus, for every 40 CCE, there may be 40+20+10+5=75 decoding candidates.

Further, there may be 6 possible payload sizes (e.g. corresponding to different Downlink Control Information (DCI) formats) for a downlink payload. For example, for 10 MHz systems, the payload sizes may include Format 1A with a payload size of 43, Format 1C with a payload size of 29 (not shown up in each subframe), Format 1 (TM1/TM2/TM7) with a payload size of 47, Format 1D with a payload size of 45 (MU-MIMO), Format 2A/2B with a payload size of 57 (LCDD or SFBC or TM8) and Format 2 (ZCDD/ 2C (TM9) with a payload size of 59.

Thus, for 8 CCEs, the UE may have to perform decoding for 15*6=90 different decoding candidates. Similarly, for 40 CCEs the UE may have to perform decoding for 75*6=450 different decoding candidates.

Format 1C is typically used only for broadcast channels (System information block 1 (SIB1)/SIBx) or Multicast control channel (MCCH). Thus, in certain aspects, the UE may perform decoding for only 5 payload sizes or formats to reduce implementation complexity. In certain aspects, for a high Signal to Noise Ratio (SNR) the UE may decode only one CCE. Also, in order to reduce the number of blind decodings, the UE may group CCEs, for example CCEs from a same PDCCH.

Once the decoding candidates are decoded, the UE may perform an error correcting procedure on decoded candidates and prune out unlikely candidates. For example, a Tailbiting Convolutional Code (TBCC) may be used for the error correcting procedure and the candidates for which a starting state does not match with the ending state may discarded (e.g., eliminated from consideration). In an aspect, the unlikely candidates may also be determined based on an energy metric that shows reliability of each decoding. In certain aspects, a combination of the two may be used. The error correction procedure yields a set of likely decoded candidates.

The likely decoded candidates typically include decoded information bits with decoded (Cyclic Redundancy Check) CRC bits appended to them. The appended CRC is typically scrambled (e.g. XORed) with a Radio Network Temporary Identifier (RNTI) at a transmitter. In certain aspects, for each likely candidate, the UE may calculate a CRC based on its information bits only (non-CRC bits) and then perform an XOR operation between the calculated CRC and each possible RNTI value. If an XOR operation yields the decoded CRC, the RNTI value used in the XOR operation is declared as the correct RNTI for that candidate. In certain aspects, for a particular decoding candidate, if none of the RNTI values yield the original CRC, the decoding candidate is discarded.

The UE may then interpret content of the PDCCH of the interfering cell based on surviving candidates. The UE may then use the interpreted PDCCH information to determine PDSCH information including RB allocation, modulation order and rank. The PDSCH information may be used for interference cancellation to aid in decoding transmissions in the serving cell.

Figure 7:
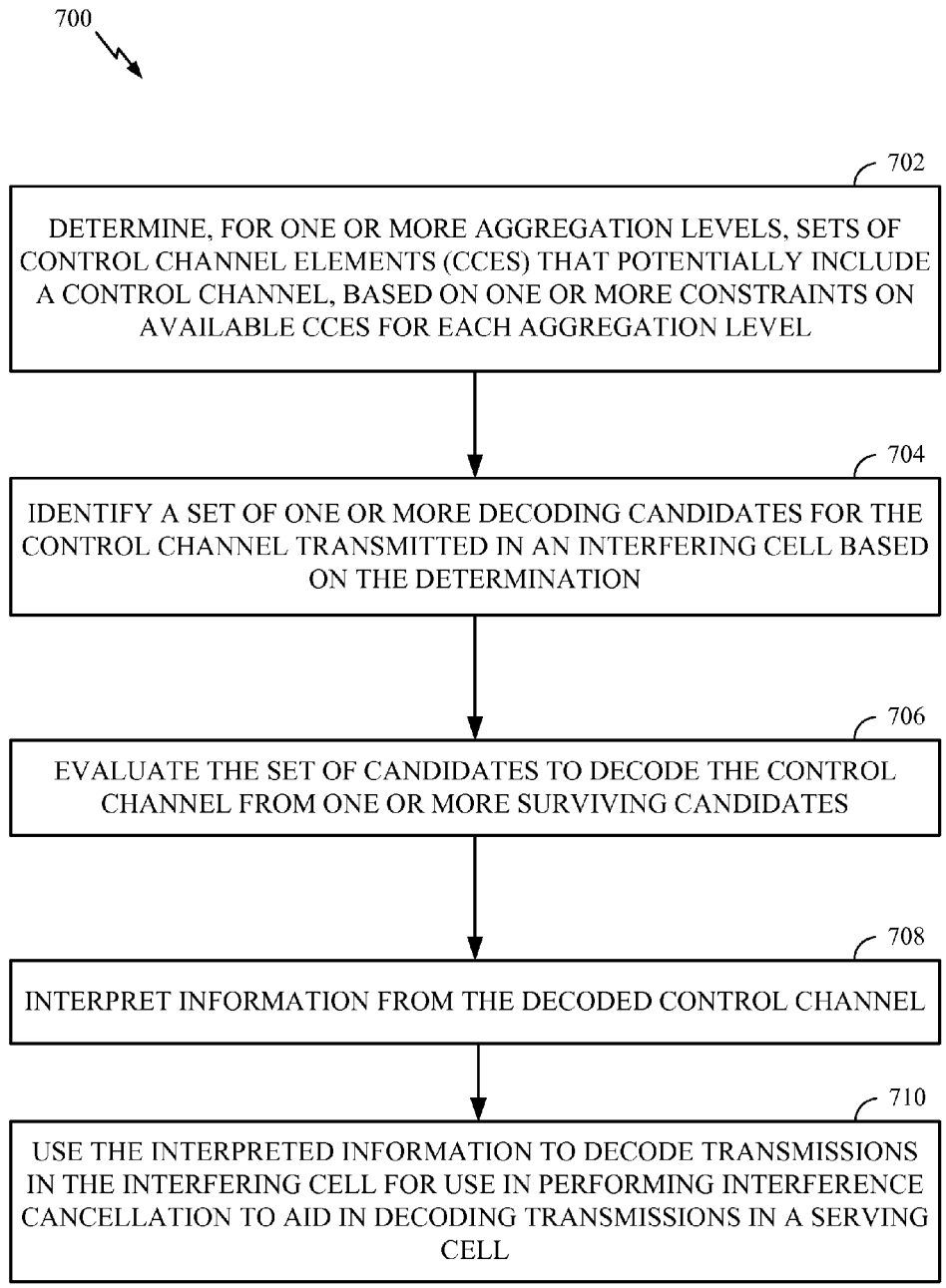
FIG. 7 illustrates a flow diagram of a method for blindly decoding interfering cell Physical Downlink Control Channel (PDCCH) to acquire interfering cell Physical Downlink Shared Channel (PDSCH) transmission information in accordance with certain aspects of the disclosure.

FIG. 7 illustrates example operations 700 that may be performed by a UE for blindly decoding interfering cell Physical Downlink Control Channel (PDCCH) to acquire interfering cell Physical Downlink Shared Channel (PDSCH) transmission information in accordance with certain aspects of the disclosure. In an aspect the UE may include the UE 102, 206 and/or 650.

Operations 700 may begin, at 702, by determining, for one or more aggregation levels, sets of CCEs that potentially include a control channel, based on one or more constraints on available CCEs for each aggregation level. At 704, a set of one or more decoding candidates may be identified for the control channel transmitted in an interfering cell based on the determination. At 706, the set of candidates may be evaluated to decode the control channel from one or more surviving candidates. At 708, information from the decoded control channel may be interpreted. At 710, the interpreted information may be used to decode transmissions in the interfering cell for use in performing interference cancellation to aid in decoding transmissions in a serving cell.

Figure 8:
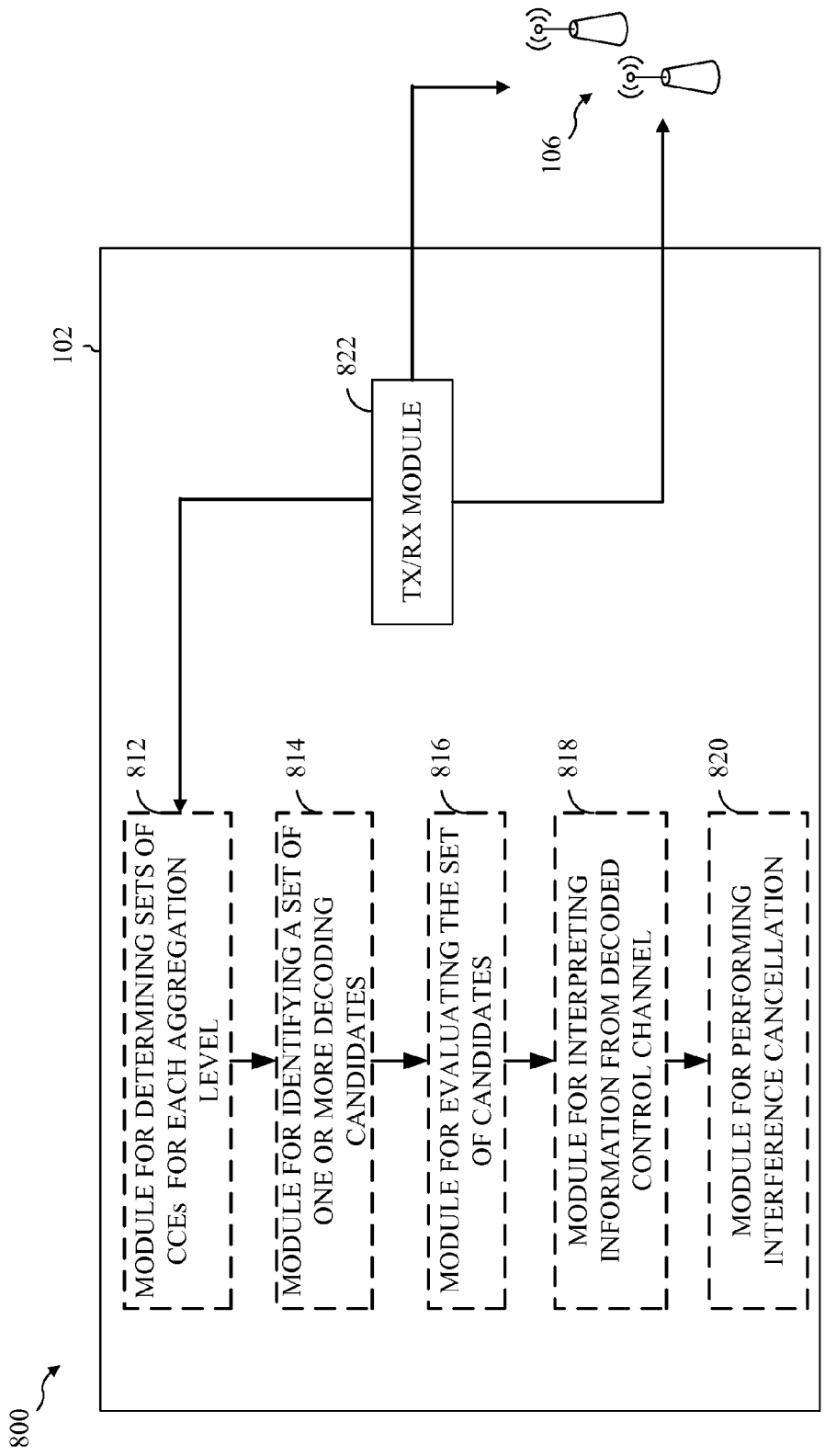
FIG. 8 is a conceptual data flow diagram illustrating the data flow between different modules/means/components in an exemplary apparatus in accordance with certain aspects of the disclosure.

FIG. 8 is a conceptual data flow diagram 800 illustrating the data flow between different modules/means/components in an exemplary apparatus (e.g., UE 102). The UE 102 may include a module 812 for determining, for one or more aggregation levels, sets of CCEs that potentially include a control channel, based on one or more constraints on available CCEs for each aggregation level, a module 814 for identifying a set of one or more decoding candidates for the control channel transmitted in an interfering cell based on the determination, a module 816 for evaluating the set of candidates to decode the control channel from one or more surviving candidates, a module 818 for interpreting information from the decoded control channel, a module 820 for using the interpreted information to decode transmissions in the interfering cell for use in performing interference cancellation to aid in decoding transmissions in a serving cell, and transceiver module 822 for transmitting signals to and receiving signals from one or more eNBs 106.

The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
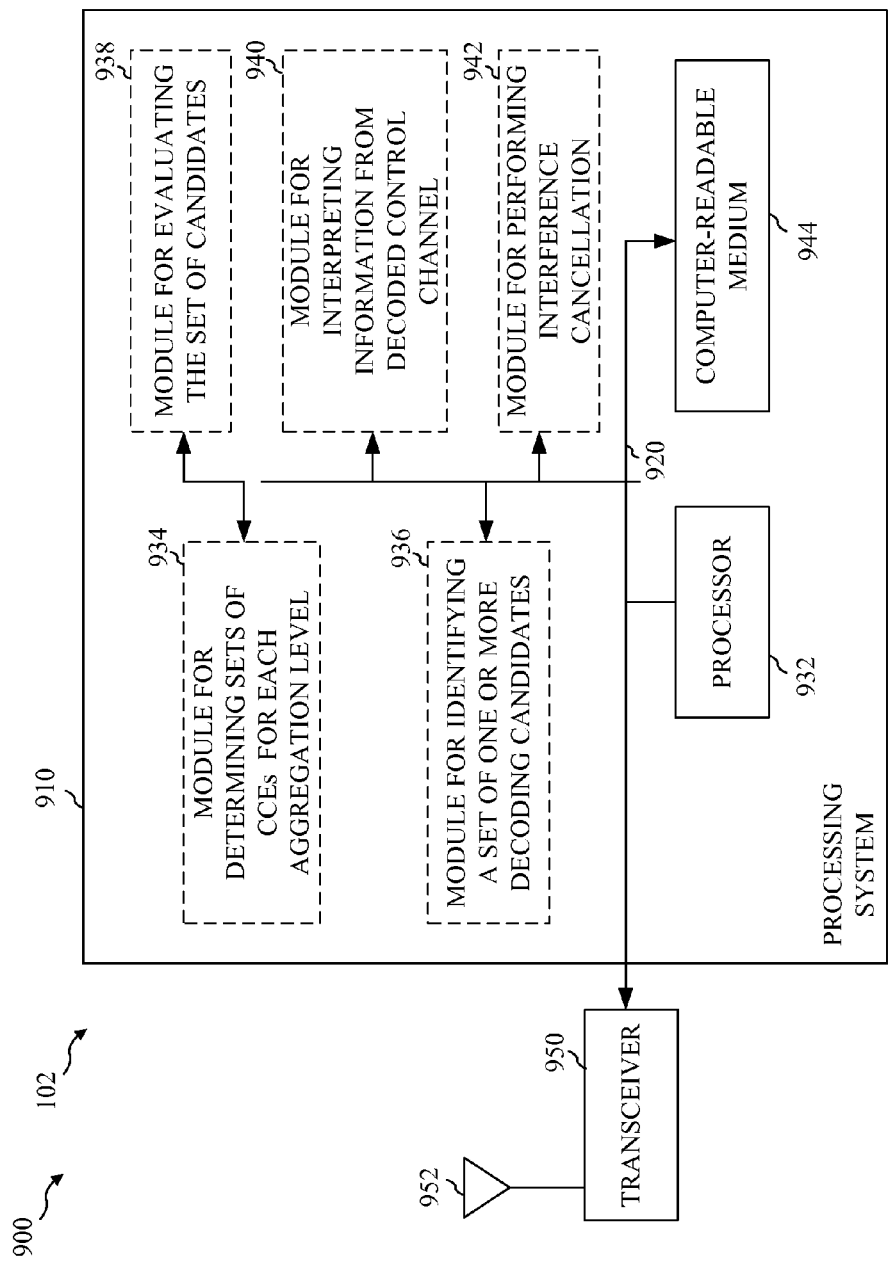
FIG. 9 is a diagram illustrating an example of a hardware implementation for an apparatus employing a processing system in accordance with certain aspects of the disclosure.

FIG. 9 is a diagram illustrating an example of a hardware implementation 900 for an apparatus (e.g., UE 102) employing a processing system 910. The processing system 910 may be implemented with a bus architecture, represented generally by the bus 920. The bus 920 may include any number of interconnecting buses and bridges depending on the specific application of the processing system 910 and the overall design constraints. The bus 920 links together various circuits including one or more processors and/or hardware modules, represented by the processor 932, the modules 934, 936, 938, 940, 942 and the computer-readable medium 944. The bus 920 may also link various other circuits such as timing sources, peripherals, voltage regulators, and power management circuits, which are well known in the art, and therefore, will not be described any further.

The processing system 910 is coupled to a transceiver 950. The transceiver 950 is coupled to one or more antennas 952. The transceiver 950 provides a means for communicating with various other apparatus over a transmission medium. The processing system 910 includes a processor 932 coupled to a computer-readable medium 944. The processor 932 is responsible for general processing, including the execution of software stored on the computer-readable medium 944. The software, when executed by the processor 932, causes the processing system 910 to perform the various functions described supra for any particular apparatus. The computer-readable medium 944 may also be used for storing data that is manipulated by the processor 932 when executing software. The processing system further includes modules 934, 936, 938, 940 and 942. The modules may be software modules running in the processor 932, resident/stored in the computer readable medium 944, one or more hardware modules coupled to the processor 932, or some combination thereof. In an aspect, the processing system 910 may be a component of the UE 650 and may include the memory 660 and/or at least one of the TX processor 668, the RX processor 656, and the controller/processor 659.

Additional Pruning Rules for Decoded PDCCH Candidates

In certain aspects, for each decoded PDCCH candidate (e.g. after TBCC decoding and RNTI derivation), based on the derived RNTI and the assumed aggregation level, a UE-specific search space corresponding to the derived RNTI may be derived. The UE-specific search space typically consists of a desirable set of CCEs. In an aspect, an assumed set of CCE(s) for the decoded PDCCH candidate may be compared with the desirable set of CCEs. If the assumed set of CCE(s) is a subset of or is equal to the desirable set of CCEs, a CRC pass may be declared, otherwise a CRC failure may be declared. For example, if a PDCCH candidate is decoded with aggregation level 1 and CCE index 5, and the derived RNTI is X, based on the subframe index and the value of X, the UE-specific search space for aggregation level 1 may be derived as, e.g., CCEs {7, 8, 9, 10, 11, 12}. Since CCE index 5 does not belong to the UE-specific search space corresponding to X, the decoded PDCCH is a false alarm and may be discarded.

In certain aspects, for a set of decoded PDCCH candidates with CRC pass, if there are two or more DL (or UL) grants for the same C-RNTI in a same subframe for a same cell, the one with the largest metric may be selected and other may be dropped, for example since there is at most one unicast DL (or UL) grant for a UE in the same subframe for the same cell.

In certain aspects, for a set of decoded PDCCH candidates with CRC pass for a same SI-RNTI, P-RNTI, or RA-RNTI in a same subframe for a same cell, the one with the largest metric may be selected and other may be dropped, for example since there is at most one grant with SI-RNTI, P-RNTI, or RA-RNTI for a UE in the same subframe for the same cell.

In certain aspects, for a set of decoded PDCCH candidates with CRC pass, if there are two or more candidates grants having overlapped CCEs in a same subframe on a same cell, the one with the largest metric may be selected and other may be dropped, for example since one CCE can carry at most one grant in the same subframe on the same cell.

In certain aspects, for a set of decoded PDCCH candidates with CRC pass for a same cell, the corresponding PDSCH assignments may not have overlapped resources unless the corresponding DCI formats are all associated with explicit MU-MIMO support (e.g., DCI formats 1D, 2B, and 2C). If at least one DCI format is not associated with explicit MU-MIMO support, at least one candidate, e.g., the one with the lowest metric, may be dropped.

In certain aspects, in subframes 0 and 5 for FDD and in subframes 0, 1, 5 and 6 for TDD, if a decoded PDCCH candidate is associated with UE-RS based PDSCH assignments (e.g., PDSCH scheduled by DCI formats 2B and 2C) and the resource assignment is at least partially overlapped with the center 6 resource blocks, the candidate may be dropped since a UE-RS based PDSCH is not supported in the center 6 RBs when there is primary synchronization signal (PSS), secondary synchronization signal (PSS), and/or primary broadcast signal (PBCH).

In certain aspects, for those survived PDCCHs with their content interpreted, additional cross-checking may be performed. For example, for the assigned PDSCH resource blocks, TPR detection may be performed to identify whether there is a PDSCH transmission or not at each assigned resource block. The results of the TPR detection may be cross-checked (e.g., via a comparison) with the PDCCH content to determine whether this PDCCH decoding is a false alarm or not.

Similarly, in certain aspects, a blind detection may be performed for the assigned PDSCH resource blocks to determine the corresponding PDSCH transmission scheme, modulation order and/or rank at those assigned resource blocks. The results of the blind decoding may be cross-checked with the PDCCH content to determine whether this PDCCH decoding is a false alarm or not.

Alternatively, in certain aspects, the blind detection results may be overwritten by using the PDCCH content.

In certain aspects, the discussions above are also applicable to any new control channels and the associated design details. As an example, an enhanced PDCCH (ePDCCH) may be introduced that utilizes resources in a region typically allocated to physical downlink shared channels (PDSCHs). In some cases, ePDCCH may be allocated resources bases on an enhanced CCE (eCCE), which may, for example, be a fraction of a conventional CCE. In any case, blind decoding of ePDCCH based transmissions in neighboring cells can be similarly performed using techniques described herein with respect to conventional PDCCHs or other type control channels.

In certain aspects, the discussions above are also applicable to any new control channels and the associated design details. As an example, enhanced PDCCH (ePDCCH) may be introduced, which can be built based on enhanced CCE (eCCE). Blind decoding of ePDCCH based transmissions in neighboring cells can be similarly performed.

In one configuration, the apparatus 800/900 for wireless communication includes means for performing each of the functions in FIG. 7. The aforementioned means may be one or more of the aforementioned modules of the apparatus 800 and/or the processing system 910 of the apparatus 900 configured to perform the functions recited by the aforementioned means. As described supra, the processing system 910 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications, comprising:
   determining, for one or more aggregation levels, sets of control channel elements (CCEs) that potentially include a control channel, based on one or more constraints on available CCEs for each aggregation level, wherein the determining comprises:
      performing a traffic to pilot ratio (TPR) estimation for resource element groups (REGs); and
      determining the sets of CCEs based on results of the TPR estimation;
   identifying a set of one or more decoding candidates for the control channel transmitted in an interfering cell based on the determination;
   evaluating the set of candidates to determine one or more surviving candidates to be used for decoding the control channel;
   decoding the control channel from the determined one or more surviving candidates;
   interpreting information from the decoded control channel; and
   using the interpreted information to decode transmissions in the interfering cell for use in performing interference cancellation to aid in decoding transmissions in a serving cell.

2. The method of claim 1, wherein one of the constraints comprises a constraint that limits, for each aggregation level, available starting CCEs for the control channel.

3. The method of claim 1, wherein evaluating the candidates comprises:
   attempting to derive radio network temporary identifiers (RNTIs) for candidates based on cyclic redundancy check (CRC) values calculated from decoded information bits and decoded CRC bits; and
   reducing the number of candidates in the candidate set by eliminating candidates for which an RNTI cannot be derived.

4. The method of claim 3, wherein using the interpreted information to decode transmissions in the interfering cell for use in performing interference cancellation to aid in decoding transmissions in a serving cell comprises:
  using a derived RNTI to decode transmissions in the interfering cell for use in performing the interference cancellation.

5. The method of claim 1, wherein identifying the set of one or more decoding candidates comprises: determining a set of possible payload sizes for the control channel based on at least one of system bandwidth of the interfering cell, a number of transmit antennas, or a type of carrier.

6. The method of claim 5, further comprising attempting to decode the decoding candidates of the control channel for each of the determined payload sizes and a plurality of aggregation levels.

7. The method of claim 1, wherein determining the sets of CCEs comprises:
  deriving information regarding the CCEs based on an identifier of the interfering cell and information obtained by decoding a broadcast channel.

8. The method of claim 1, wherein the control channel comprises a Physical Downlink Control Channel (PDCCH) and the transmissions in the interfering cell comprise a Physical Downlink Shared Channel (PDSCH) corresponding to the PDCCH.

9. The method of claim 8, wherein using the interpreted information to decode transmissions in the interfering cell comprises using the interpreted information to determine resource block (RB) allocation, modulation order, and rank of the PDSCH.

10. A method for wireless communications, comprising:
  determining, for one or more aggregation levels, sets of control channel elements (CCEs) that potentially include a control channel, based on one or more constraints on available CCEs for each aggregation level;
  identifying a set of one or more decoding candidates for the control channel transmitted in an interfering cell based on the determination;
  evaluating the set of candidates to determine one or more surviving candidates to be used for decoding the control channel, wherein evaluating the candidates comprises:
    attempting to derive radio network temporary identifiers (RNTIs) for candidates based on cyclic redundancy check (CRC) values calculated from decoded information bits and decoded CRC bits; and
    reducing the number of candidates in the candidate set by eliminating candidates for which an RNTI cannot be derived;
  decoding the control channel from the determined one or more surviving candidates;
  interpreting information from the decoded control channel;
  using the interpreted information to decode transmissions in the interfering cell for use in performing interference cancellation to aid in decoding transmissions in a serving cell;
  deriving a User Equipment (UE)-specific search space including a desirable set of CCEs corresponding to a derived RNTI, based on the derived RNTI and an assumed aggregation level;
  declaring a CRC fail if an assumed set of CCEs corresponding to a decoded candidate for the derived RNTI is not a subset of or equal to the desirable set of CCEs; and
  discarding the decoded candidate in response to the declaration of the CRC fail.

11. A method for wireless communications, comprising:
  determining, for one or more aggregation levels, sets of control channel elements (CCEs) that potentially include a control channel, based on one or more constraints on available CCEs for each aggregation level;
  identifying a set of one or more decoding candidates for the control channel transmitted in an interfering cell based on the determination;
  evaluating the set of candidates to determine one or more surviving candidates to be used for decoding the control channel, wherein evaluating the candidates comprises:
    attempting to derive radio network temporary identifiers (RNTIs) for candidates based on cyclic redundancy check (CRC) values calculated from decoded information bits and decoded CRC bits; and
    reducing the number of candidates in the candidate set by eliminating candidates for which an RNTI cannot be derived;
  decoding the control channel from the determined one or more surviving candidates;
  interpreting information from the decoded control channel;
  using the interpreted information to decode transmissions in the interfering cell for use in performing interference cancellation to aid in decoding transmissions in a serving cell;
  if CRC pass is declared for multiple candidates for a same derived RNTI in a same subframe for a same cell, selecting a candidate with a largest metric and discarding the remaining candidates.

12. A method for wireless communications, comprising:
  determining, for one or more aggregation levels, sets of control channel elements (CCEs) that potentially include a control channel, based on one or more constraints on available CCEs for each aggregation level;
  identifying a set of one or more decoding candidates for the control channel transmitted in an interfering cell based on the determination;
  evaluating the set of candidates to determine one or more surviving candidates to be used for decoding the control channel, wherein evaluating the candidates comprises:
    attempting to derive radio network temporary identifiers (RNTIs) for candidates based on cyclic redundancy check (CRC) values calculated from decoded information bits and decoded CRC bits; and
    reducing the number of candidates in the candidate set by eliminating candidates for which an RNTI cannot be derived;
  decoding the control channel from the determined one or more surviving candidates;
  interpreting information from the decoded control channel;
  using the interpreted information to decode transmissions in the interfering cell for use in performing interference cancellation to aid in decoding transmissions in a serving cell;
  if CRC pass is declared for multiple candidates having overlapping CCEs in a same subframe on a same cell, selecting a candidate with a largest metric and discarding the remaining candidates.

13. A method for wireless communications, comprising:
  determining, for one or more aggregation levels, sets of control channel elements (CCEs) that potentially include a control channel, based on one or more constraints on available CCEs for each aggregation level;
  identifying a set of one or more decoding candidates for the control channel transmitted in an interfering cell based on the determination;
  evaluating the set of candidates to determine one or more surviving candidates to be used for decoding the control channel, wherein evaluating the candidates comprises:

attempting to derive radio network temporary identifiers (RNTIs) for candidates based on cyclic redundancy check (CRC) values calculated from decoded information bits and decoded CRC bits; and reducing the number of candidates in the candidate set by eliminating candidates for which an RNTI cannot be derived;

decoding the control channel from the determined one or more surviving candidates;

interpreting information from the decoded control channel;

using the interpreted information to decode transmissions in the interfering cell for use in performing interference cancellation to aid in decoding transmissions in a serving cell;

if CRC pass is declared for a set of candidates for a same cell and if at least one Downlink Control Information (DCI) format is not associated with explicit Multiple User-Multiple Input Multiple Output (MU-MIMO) support, discarding at least one candidate with a lowest metric.

14. A method for wireless communications, comprising:

determining, for one or more aggregation levels, sets of control channel elements (CCEs) that potentially include a control channel, based on one or more constraints on available CCEs for each aggregation level;

identifying a set of one or more decoding candidates for the control channel transmitted in an interfering cell based on the determination;

evaluating the set of candidates to determine one or more surviving candidates to be used for decoding the control channel, wherein evaluating the candidates comprises:
reducing a number of candidates in the candidate set by eliminating candidates from consideration that do not satisfy tailbiting convolutional code (TBCC) metrics;

decoding the control channel from the determined one or more surviving candidates;

interpreting information from the decoded control channel;

using the interpreted information to decode transmissions in the interfering cell for use in performing interference cancellation to aid in decoding transmissions in a serving cell.

15. A method for wireless communications, comprising:

determining, for one or more aggregation levels, sets of control channel elements (CCEs) that potentially include a control channel, based on one or more constraints on available CCEs for each aggregation level;

identifying a set of one or more decoding candidates for the control channel transmitted in an interfering cell based on the determination;

evaluating the set of candidates to determine one or more surviving candidates to be used for decoding the control channel;

decoding the control channel from the determined one or more surviving candidates;

interpreting information from the decoded control channel;

using the interpreted information to decode transmissions in the interfering cell for use in performing interference cancellation to aid in decoding transmissions in a serving cell;

wherein the control channel comprises a Physical Downlink Control Channel (PDCCH) and the transmissions in the interfering cell comprise a Physical Downlink Shared Channel (PDSCH) corresponding to the PDCCH, the method further comprising:

performing Traffic to Pilot Ratio (TPR) detection for assigned PDSCH resource blocks (RBs) to detect a PDSCH transmission in each of the assigned PDSCH RBs; and checking if the interpreted information of the PDCCH is correct based on a comparison of results of the TPR detection with the interpreted information.

16. A method for wireless communications, comprising:

determining, for one or more aggregation levels, sets of control channel elements (CCEs) that potentially include a control channel, based on one or more constraints on available CCEs for each aggregation level;

identifying a set of one or more decoding candidates for the control channel transmitted in an interfering cell based on the determination;

evaluating the set of candidates to determine one or more surviving candidates to be used for decoding the control channel;

decoding the control channel from the determined one or more surviving candidates;

interpreting information from the decoded control channel;

using the interpreted information to decode transmissions in the interfering cell for use in performing interference cancellation to aid in decoding transmissions in a serving cell;

wherein the control channel comprises a Physical Downlink Control Channel (PDCCH) and the transmissions in the interfering cell comprise a Physical Downlink Shared Channel (PDSCH) corresponding to the PDCCH, the method further comprising:

performing blind detection for assigned PDSCH resource blocks (RBs) to determine corresponding PDSCH information; and checking if the interpreted information of the PDCCH is correct based on a comparison of the determined PDSCH information with the interpreted information.

17. An apparatus for wireless communications, comprising:

means for determining, for one or more aggregation levels, sets of control channel elements (CCEs) that potentially include a control channel, based on one or more constraints on available CCEs for each aggregation level, wherein the means for determining is configured to:
perform a traffic to pilot ratio (TPR) estimation for resource element groups (REGs); and
determine the sets of CCEs based on results of the TPR estimation;

means for identifying a set of one or more decoding candidates for the control channel transmitted in an interfering cell based on the determination;

means for evaluating the set of candidates to determine one or more surviving candidates to be used for decoding the control channel;

means for decoding the control channel from the determined one or more surviving candidates;

means for interpreting information from the decoded control channel; and means for using the interpreted information to decode transmissions in the interfering cell for use in performing interference cancellation to aid in decoding transmissions in a serving cell.

18. The apparatus of claim 17, wherein one of the constraints comprises a constraint that limits, for each aggregation level, available starting CCEs for the control channel.

19. The apparatus of claim 17, wherein the means for evaluating the candidates is configured to:

attempt to derive radio network temporary identifiers (RNTIs) for candidates based on cyclic redundancy check (CRC) values calculated from decoded information bits and decoded CRC bits; and reduce the number of candidates in the candidate set by eliminating candidates for which an RNTI cannot be derived.

20. The apparatus of claim 19, wherein the means for using the interpreted information to decode transmissions in the interfering cell for use in performing interference cancellation to aid in decoding transmissions in a serving cell is configured to:

use a derived RNTI to decode transmissions in the interfering cell for use in performing the interference cancellation.

21. The apparatus of claim 17, wherein the means for identifying the set of one or more decoding candidates is configured to:

determine a set of possible payload sizes for the control channel based on at least one of system bandwidth of the interfering cell, a number of transmit antennas, or a type of carrier.

22. The apparatus of claim 21, further comprising means for attempting to decode the decoding candidates of the control channel for each of the determined payload sizes and a plurality of aggregation levels.

23. The apparatus of claim 17, wherein the control channel comprises a Physical Downlink Control Channel (PDCCH) and the transmissions in the interfering cell comprise a Physical Downlink Shared Channel (PDSCH) corresponding to the PDCCH.

24. The apparatus of claim 23, wherein the means for using the interpreted information to decode transmissions in the interfering cell is configured to use the interpreted information to determine resource block (RB) allocation, modulation order, and rank of the PDSCH.

25. An apparatus for wireless communications, comprising:

means for determining, for one or more aggregation levels, sets of control channel elements (CCEs) that potentially include a control channel, based on one or more constraints on available CCEs for each aggregation level;

means for identifying a set of one or more decoding candidates for the control channel transmitted in an interfering cell based on the determination;

means for evaluating the set of candidates to determine one or more surviving candidates to be used for decoding the control channel, wherein the means for evaluating the candidates is configured to:

reduce a number of candidates in the candidate set by eliminating candidates from consideration that do not satisfy tailbiting convolutional code (TBCC) metrics;

means for decoding the control channel from the determined one or more surviving candidates;

means for interpreting information from the decoded control channel; and means for using the interpreted information to decode transmissions in the interfering cell for use in performing interference cancellation to aid in decoding transmissions in a serving cell.

26. An apparatus for wireless communications, comprising:

at least one processor configured to determine, for one or more aggregation levels, sets of control channel elements (CCEs) that potentially include a control channel, based on one or more constraints on available CCEs for each aggregation level, identify a set of one or more decoding candidates for the control channel transmitted in an interfering cell based on the determination, evaluate the set of candidates to determine one or more surviving candidates to be used for decoding the control channel, decode the control channel from the determined one or more surviving candidates, interpret information from the decoded control channel, and use the interpreted information to decode transmissions in the interfering cell for use in performing interference cancellation to aid in decoding transmissions in a serving cell, wherein the at least one processor is configured to determine the sets of CCEs by performing a traffic to pilot ratio (TPR) estimation for resource element groups (REGs) and determining the sets of CCEs based on results of the TPR estimation; and a memory coupled with the at least one processor.

27. A computer program product for wireless communications, comprising:

a non-transitory computer-readable medium comprising computer executable code for:

determining, for one or more aggregation levels, sets of control channel elements (CCEs) that potentially include a control channel, based on one or more constraints on available CCEs for each aggregation level, wherein the determining comprises:

performing a traffic to pilot ratio (TPR) estimation for resource element groups (REGs); and determining the sets of CCEs based on results of the TPR estimation;

identifying a set of one or more decoding candidates for the control channel transmitted in an interfering cell based on the determination;

evaluating the set of candidates to determine one or more surviving candidates to be used for decoding the control channel;

decoding the control channel from the determined one or more surviving candidates;

interpreting information from the decoded control channel; and using the interpreted information to decode transmissions in the interfering cell for use in performing interference cancellation to aid in decoding transmissions in a serving cell.

* * * * *